United States Patent [19]
Will et al.

[11] 3,955,508
[45] May 11, 1976

[54] ACCELERATION INTEGRATING SWITCH

[75] Inventors: Albert S. Will, Bethesda; Robert R. Wilson, Chillum, both of Md.

[73] Assignee: The United States of America as represented by the Secretary of the Navy, Washington, D.C.

[22] Filed: Jan. 27, 1965

[21] Appl. No.: 430,509

[52] U.S. Cl............................................. 102/70.2 R
[51] Int. Cl.²........................................ F42C 11/00
[58] Field of Search ............... 102/70.2, 76, 78, 83, 102/84; 200/61.45, 61.53

[56] References Cited
UNITED STATES PATENTS

| 2,642,801 | 6/1953 | Gleason .......................... | 102/70.2 R |
| 2,748,704 | 6/1956 | Dinsmoor........................ | 102/70.2 R |
| 3,000,315 | 9/1961 | Anastasia et al................ | 102/70.2 R |

*Primary Examiner*—Charles T. Jordan

EXEMPLARY CLAIM

1. An acceleration responsive timing device comprising
a substantially cylindrical housing,
a motor and gearing contained within said housing,
a shaft coupled to said gearing to be rotated thereby at a predetermined rate, said shaft being coaxial with said cylindrical housing,
switch carrying discs mounted within said housing about said shaft, said switches being sequentially actuated upon rotation of said shaft,
a power source for said motor,
and acceleration responsive means for operatively connecting the power source to the motor only after the device has been subjected to a sustained acceleration of at least a predetermined level for at least a predetermined period of time said acceleration responsive means having a base attachable to said housing, an inertial mass slideably mounted on said base between initial and final positions, a follower slideably mounted on said base, resilient means coupling said follower to said inertial mass for movement therewith, and contact means mounted on said follower and said base and operable to perform switching functions in the motor input circuit upon movement of said follower.

4 Claims, 5 Drawing Figures

U.S. Patent  May 11, 1976  Sheet 1 of 2  3,955,508
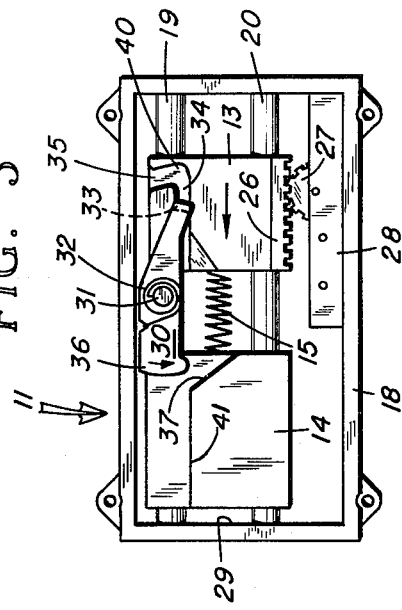
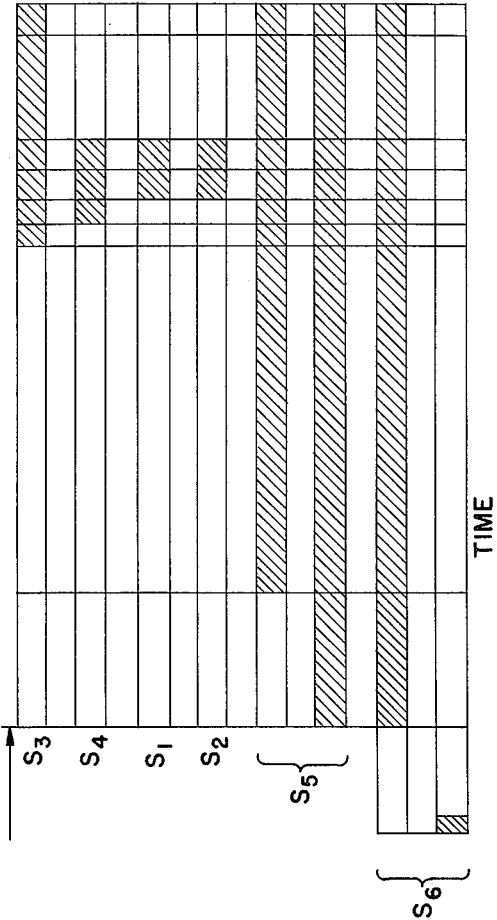
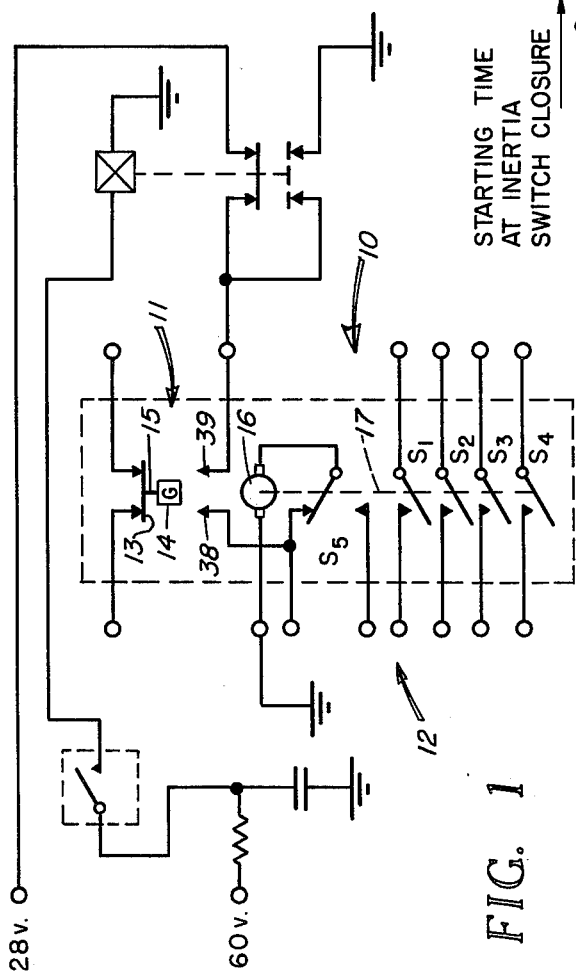
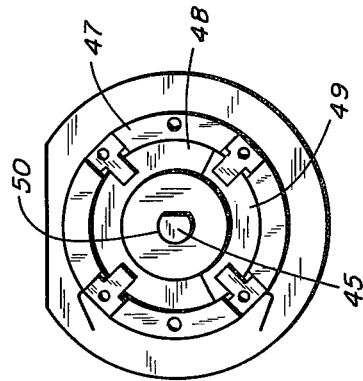
Albert S. Will
Robert R. Wilson
INVENTORS.

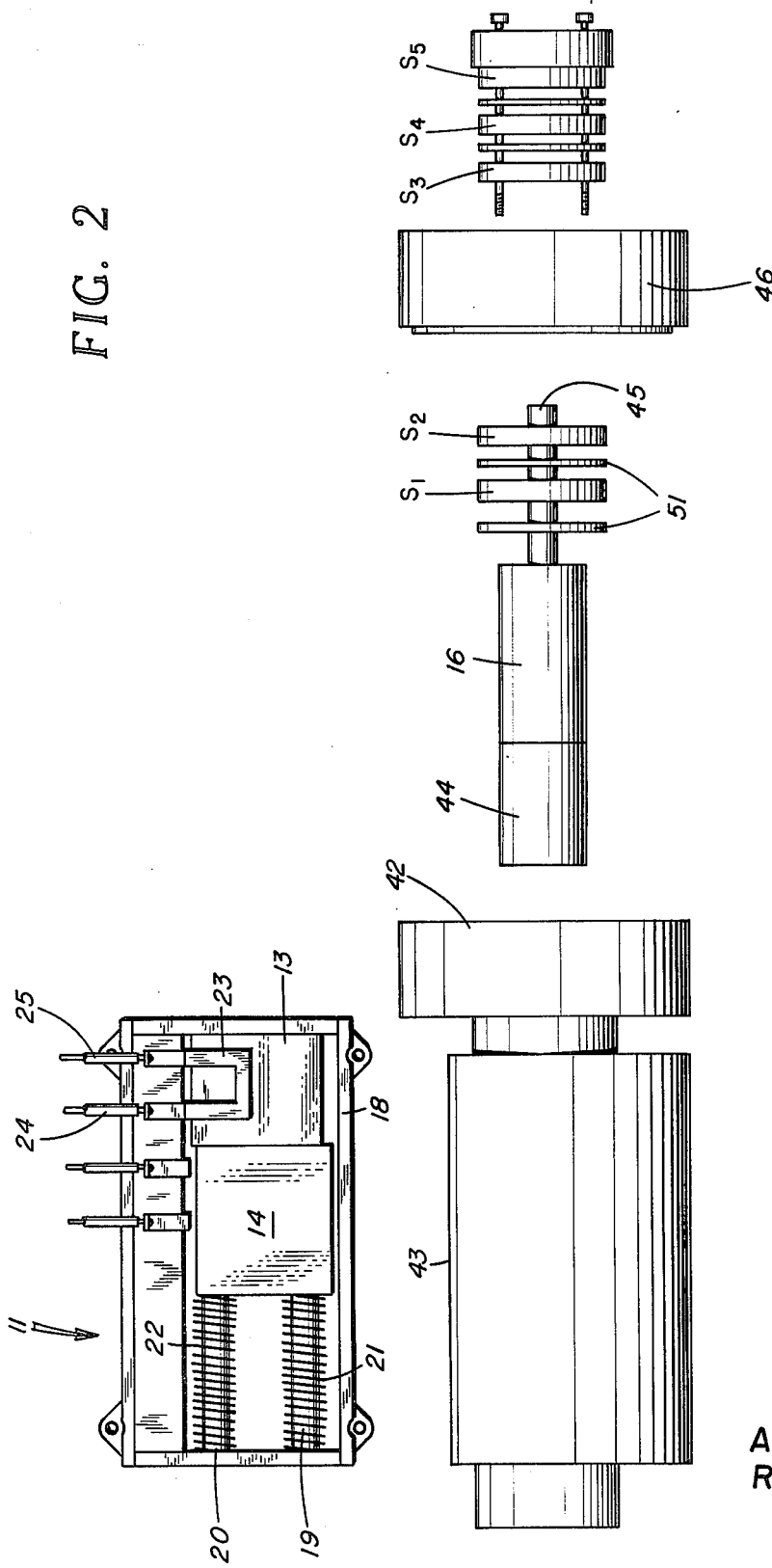

ACCELERATION INTEGRATING SWITCH

The invention described herein may be manufactured and used by or for the Government of the United States of America for governmental purposes without the payment of any royalties thereon or therefor.

The present invention relates to a safety and arming device and more particularly to an acceleration integration switch for an ordnance missile adaption kit which combines an acceleration sensing device and a fixed delay timer for preventing the missile warhead from receiving the signals necessary to arm and fire it for a predetermined period of time subsequent to the subjection of the missile to a sustained launching acceleration exceeding a critical value determined by the design and/or setting of the device.

The invention to which the present application is directed was developed as part of the SUBROC weapon system although it will be clear from the detailed description to follow that it may be employed with any ordinary missile using acceleration-responsive delay arming. The SUBROC missile is an anti-submarine weapon provided with a nuclear warhead and designed to be launched from a torpedo tube of an attack submarine, thereafter to emerge from the water and go through an air boost phase depending upon the selected range, during which it is directed to the target area by terminal guidance, and then to re-enter the water in the vicinity of the target. In order to insure high level of safety for the launching submarine, it was necessary to incorporate as one of the many safety features of the weapon an acceleration-responsive delay arming switch which, during a normal flight, will prevent arming of the warhead until the missile has been launched and has reached a safe distance. Various types of acceleration integrating switches were considered for this purpose, but normal missile acceleration integration devices are not adequate to provide for the switching of contacts heavy enough to remain closed during the water entry shock experienced by the SUBROC missile, and therefore none of the available devices were suitable for this use. One unsuccessful design utilized a flywheel which was accelerated during the rocket motor burning phase to store sufficient energy to close heavy contacts at rocket motor burn-out, but this mechanical approach was abandoned because of size and weight considerations and the expense in manufacturing.

Therefore, an object of this invention is to provide an acceleration mechanism sensitive enough to respond to the low g forces available from the SUBROC motor, while at the same time being capable of providing sufficient power to drive relatively heavy contacts which will remain closed during severe water re-entry shock.

Another object of the present invention is to provide an acceleration responsive timing device for arming a missile warhead only after the missile has been launched and has reached a safe distance.

Still another object of the invention is to provide a safety and arming device of the character described and having arming contacts capable of withstanding the high shock loadings experienced at missile impact.

These objectives are fulfilled by the acceleration integrating switch of the present invention in which a suitable accelerometer with appropriate switching contacts is coupled with a permanent magnet d.c. motor for driving through an intermediate gear train a set of heavy wafer switch arming contacts. An assured safe distance can be measured by two integrations of acceleration or it can be approximated by measuring at least a minimum acceleration for at least a minimum period of time. The present invention relies upon the latter method, which is often called pseudo-integration. Accordingly, if the missile experiences a predetermined minimum acceleration force for a predetermined minimum period of time during the boost phase, then it may be safely assumed that barring gross aerodynamic failure the missile will continue its flight and eventually reach a safe distance of separation from the launching site, and it is only necessary thereafter to allow sufficient time for the missile to attain that separation. Hence the acceleration integrating switch of the present invention begins its function after launching has taken place at a point where the missile has cleared the tube and the rocket motor ignites. A mass-spring escapement mechanism the senses rocket motor acceleration, and upon certain environmental conditions prevalent only in normal missile trajectory, this time-delay mechanism closes and locks contacts which provide power to the motor-driven arming or timing switch.

The novel features of the present invention, as well as additional objects and advantages thereof, will be better understood from the following detailed description when read in connection with the accompanying drawings wherein:

FIG. 1 is a schematic diagram of an acceleration integrating arming switch in accordance with the present invention;

FIG. 2 is an exploded view of a preferred embodiment of the acceleration integrating arming switch assembly illustrating the acceleration sensing device and the motor-driven timing and arming switch;

FIG. 3 is a bottom sectional view of the acceleration sensing device shown in FIG. 2, illustrating the inertial mass thereof in the armed position and the follower intermediate its safe and armed positions, and further showing the locking lever for retaining the inertial mass and follower in the armed position when the escapement has timed-out;

FIG. 4 is an end view of the motor-driven arming switch illustrating the wafer type contact preferably utilized in the present invention; and FIG. 5 is a schematic diagram illustrating the sequence in which the various switches of the present invention are to be opened and closed during the arming operation initiated during the launching of the missile.

Referring now to the drawings and more particularly to FIG. 1, there is shown an acceleration integrating switch 10 comprising an inertially responsive switch 11 and a motor-driven timing switch 12. Switch 11 is provided with normally-open and normally-closed contacts operated by a follower 13 coupled to an inertial mass 14 by means of a tension spring 15 and coupled to an escapement mechanism which provides a time delay in the actuation of the switch and permits actuation to occur only after a predetermined minimum acceleration force has been experienced for a predetermined minimum period of time. The timing switch 12, which becomes operable upon the actuation of switch 11, contains a d.c. permanent magnetic motor 16 having an integral planetary gear reduction box which drives, through a mechanical connection 17, a plurality of movable switch contacts $S_1, S_2, S_3, S_4$ and $S_5$ in the arming circuits of the weapon toward the closed or armed positions, to provide a fixed time delay in the arming process following a successful launching of the weapon and thereby assuring that a safe separation between the weapon and the launching crew will be attained before the weapon becomes armed. The precise details and operation of the various switches will be described hereinafter.

Attention is now directed to FIGS. 2 and 3, and more specifically to the acceleration sensing switch 11 shown therein which comprises a base 18 having a pair of guide rods 19 and 20 mounted thereon. The inertial mass 14 and plastic block follower 13 are slideably mounted on the guide rods 19 and 20 for movement axially thereof. A tension spring 15 interconnects the mass 14 and the follower 13 and, upon movement of the inertial mass to the left as viewed in the drawings, tends to move the follower in the same direction. A pair of compression springs 21 and 22 are mounted on the guide rods 19 and 20, respectively, and normally urge the inertial mass 14 and follower 13 to their safe positions as illustrated in FIG. 2.

An electrically conductive strip 23 is mounted on the follower 13, and when the follower is in the safe position illustrated in FIG. 2, the conductive strip 23 closes a safing circuit between electrical conductors 24 and 25 and their associated terminals. A rack 26 is mounted on the follower 13 and is in mesh with a first gear 27 of an escapement 28 which is in turn secured in position on the base 18. It is the escapement 28 which provides a suitable time delay in the movement of the follower 13 to the left under the influence of the tension spring 15.

Operatively, then, the switch 11 is mounted in the missile positioned so that the rear of the missile would be to the left as the switch is viewed in the drawings. When the missile is fired and begins to accelerate, the inertial mass 14 travels along the guide rods 19 and 20, against the force exerted by compression springs 21 and 22, and bottoms against flange 29 at the end of base 18, as shown in FIG. 3. As the mass 14 moves, it extends the tension spring 15 which exerts on the plastic block follower 13 a force in addition to that caused by acceleration. The follower 13, however, is precluded from immediately moving by the action of the escapement 28 which imposes a time delay on this movement. When the follower 13 begins to move, the safing circuit is interrupted by movement of the conductive strip 23 out of engagement with the terminals of the conductors 24 and 25. These contacts may be used to provide a monitor circuit to indicate that the device is at its zero setting.

A locking lever 30 is pivoted on a shaft 31 and is provided with a torsion spring 32 which normally urges rotation of the lever 30 about shaft 31 in the direction shown by the curved arrow in FIG. 3. Movement of the locking lever 30 is normally precluded by a tang 33 formed on one end thereof projecting into a slot 34 formed on the bottom side of the follower 13. When the escapement has timed-out, but before the follower 13 has completed its travel, the tang 33 is then opposite an offset portion 35 of the slot 34. This permits the torsion spring 32 to rotate the locking lever 30 so that an end portion 36 thereof engages a locking surface 37 on the inertial mass 14 to lock the mass and hence the follower in the armed position. When the follower is in this position, the conductive strip 23 closes an arming circuit by engaging the terminals of a pair of conductors 38 and 39, thereby to supply the motor 16 with the required power for its operation. This commits the switch 11 and completes its function.

It should be observed that there is a maximum speed at which the plastic block follower 13 may move and that faster motion will produce a fail-safe condition in the switch 11. If the escapement 28, for example, has a broken link in its gear train and the plastic block follower 13 is permitted to follow the inertial mass 14 unrestrained without the required delay time, tang 33 will pass slightly beyond the offset portion 35 of slot 34 and bind within a curved notch 40 at one end of the slot 34, thereby preventing rotation of lever 30 by torsion spring 32 when the inertial mass 14 bottoms and end portion 36 of the lever 30 no longer rides against the side of the mass 14. Another contemplated, but not illustrated, provision for the acceleration sensing device 11 is an external reset feature built therein for the purpose of resetting the armed switch without disassembling the entire unit.

Referring again to FIGS. 1 and 2, when the switch 11 is committed so that the circuit including contacts 38 and 39 and the conductive strip 23 of follower 13 is closed, then 28 volt missile power is supplied to the motor 16 through switch $S_5$, as shown. The motor 16 with its associated switching is used as a safe distance device, measuring a safe distance-time following the delay time required for closure of the acceleration switch 11.

The motor 16 is shown in FIG. 2 as being adapted for positioning within a cylindrical housing 42 having one planar surface 43 for supporting the acceleration switch 11 and having further provision thereon for the attachment of a continuation housing 46 closing the end of housing 42 and containing the heavy wafer contacts of switches $S_1$ through $S_5$. Numeral 44 indicates the casing of a high ratio reduction gearing system between the motor 16 and output shaft 45. The output shaft has a flat surface extending along the axial length thereof for providing an interlocking and driving relationship between the shaft and the wafer switches which are mounted thereon.

Each switch element comprises a stationary ring-shaped piece 47 secured to the housing assembly and supporting a set of fixed contacts equally spaced about the periphery thereof, a central rotor disc 48 rotatably positioned within the ring piece, and a flat arcuate-shaped conductive strip or movable contact 49 secured to and forming part of the rotor 48, as shown in FIG. 4. The wafer switches are mounted on the output shaft 45 of motor 16 through central apertures 50 in the rotors 48, which apertures are provided with one flat inside surface to match the cross-sectional dimension of the shaft 45. Spacing, non-conductive discshaped members 51 are positioned on the output shaft 45 between the several wafer switches.

Thus, it may be seen that the motor 16, when supplied with the required power for operation, drives shaft 45 through an intermediate gear train to rotate therewith the rotors 48, and thereby moves the conductive strips 49 on the various rotors to open and close circuits between the respective fixed contacts connected thereto. The conductive strips 49 may vary as to their respective arcuate lengths for the purpose of providing the desired sequence of circuit closing and opening functions, such as illustrated in FIG. 5.

Referring now to FIG. 5 it will be observed that the motor 16, when supplied with power upon the actuation of inertia switch 11, turns the rotors 48 of the wafer switches $S_1$ through $S_5$ so that the conductive strips or movable contacts 49 will sequentially close and open the arming circuits in a prescribed manner. Thus it may be seen that wafer switch $S_3$ closes first, then switch $S_4$, and then switches $S_1$ and $S_2$. Upon closure of switches $S_1$ and $S_2$, switch $S_5$ then opens, thereby removing the 28 volt missile power from motor 16. The function of the acceleration integrating arming switch 10 is then complete. Under conditions of normal flight, where the armed missile re-enters the water after it has reached a minimum safedistance as assured by the completion of the acceleration integration arming switch cycle, the wafer switches cannot be rotated by outside forces, such as those to be experienced by the severe water re-entry shock, because of the high resistance of the gearing in casing 44 to rotation of the output shaft 45.

Therefore, in order to achieve arming with the present invention the following sequence of events must occur:

During the boost phase in the missile trajectory, if the acceleration switch 11 experiences a sustained acceleration greater than the predetermined design g-load for a period of time exceeding a predetermined time interval established by escapement 28, then follower 13 will become locked in the arming position and 28 volt missile power may be supplied through the circuit including contacts 38 and 39, conductive strips 23 of follower 13 and wafer switch $S_5$ to operate the motor 16 and thereby drive the movable contacts in switches $S_1$ through $S_5$. The time delay established by the movement of the movable contacts of switches $S_1$ through $S_5$ to the armed position is such that on a normal trajectory the missile warhead will not become armed until it has traveled a distance greater than the minimum safe distance.

However, if the proper acceleration is not attained and sustained for a sufficient length of time, the movable contact 23 of the acceleration switch 11 will be returned to its initial motor input circuit-opening position, thereby preventing any power from being supplied to the arming motor 16. No arming thus occurs and the missile becomes a dud.

On the other hand, once the arming cycle of the acceleration integrating switch 10 has been completed, the opening of switch $S_5$ will preclude any stray voltages which may appear in the system circuitry from supplying further power to the motor 16, and hence will insure that the weapon remain in the armed condition.

Obviously many modifications and variations of the present invention are possible in the light of the above teachings. It is therefore to be understood that within the scope of the appended claims, the invention may be practiced otherwise than as specifically described.

What is claimed is:

1. An acceleration responsive timing device comprising
   a substantially cylindrical housing,
   a motor and gearing contained within said housing,
   a shaft coupled to said gearing to be rotated thereby at a predetermined rate, said shaft being coaxial with said cylindrical housing,
   switch carrying discs mounted within said housing about said shaft, said switches being sequentially actuated upon rotation of said shaft,
   a power source for said motor,
   and acceleration responsive means for operatively connecting the power source to the motor only after the device has been subjected to a sustained acceleration of at least a predetermined level for at least a predetermined period of time said acceleration responsive means having a base attachable to said housing, an inertial mass slideably mounted on said base between initial and final positions, a follower slideably mounted on said base, resilient means coupling said follower to said inertial mass for movement therewith, and contact means mounted on said follower and said base and operable to perform switching functions in the motor input circuit upon movement of said follower.

2. An acceleration responsive timing device as recited in claim 1 including
   an escapement mounted on said base and connected to said follower for providing a time delay in the follower movement,
   second resilient means for normally urging said inertial mass and follower to said initial position, and
   locking means operable by said follower when said escapement has timed out for holding the inertial mass and follower in said final position.

3. An acceleration responsive timing device comprising
   a substantially cylindrical housing,
   a motor and gearing contained within said housing,
   a shaft coupled to said gearing to be rotated thereby at a predetermined rate, said shaft being coaxial with said cylindrical housing,
   switch carrying discs within said housing about said shaft,
   said switches being sequentially actuated upon rotation of said shaft,
   said switch carrying discs comprising a plurality of ring-shaped discs surrounding said shaft in coaxial relation thereto,
   said discs being fixed within said housing in nonrotating relationship with said shaft,
   each of said discs having a plurality of fixed contacts positioned thereon,
   a flat disc-shaped rotor rotatably secured within the central portion of each ring shaped disc,
   each of said rotors being provided with an arcuate conductive strip adapted to connect the fixed contacts on said disc when the rotor is in a given angular relationship therewith,
   each rotor being interlocked with said shaft for rotation therewith, whereby selected circuits including the fixed contacts on said ring-shaped discs may be operatively closed and opened upon rotation of said shaft and rotors by said motor,
   a power source for said motor, and
   acceleration means for operatively connecting the power source to the motor only after the device has been subjected to a sustained acceleration of at least a predetermined level for at least a predetermined period of time.

4. An acceleration responsive timing device as recited in claim 3 wherein said switch carrying discs are separated by non-conductive spacing discs.

* * * * *